Figure 4:
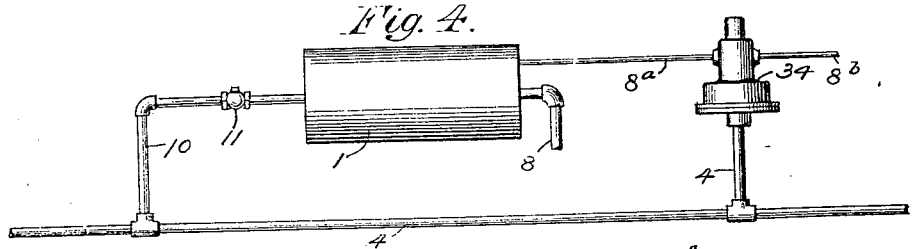

No. 866,448. PATENTED SEPT. 17, 1907.
C. C. FARMER & W. V. TURNER.
PRESSURE GOVERNING DEVICE FOR PUMPS.
APPLICATION FILED JAN. 14, 1904.
3 SHEETS—SHEET 1.
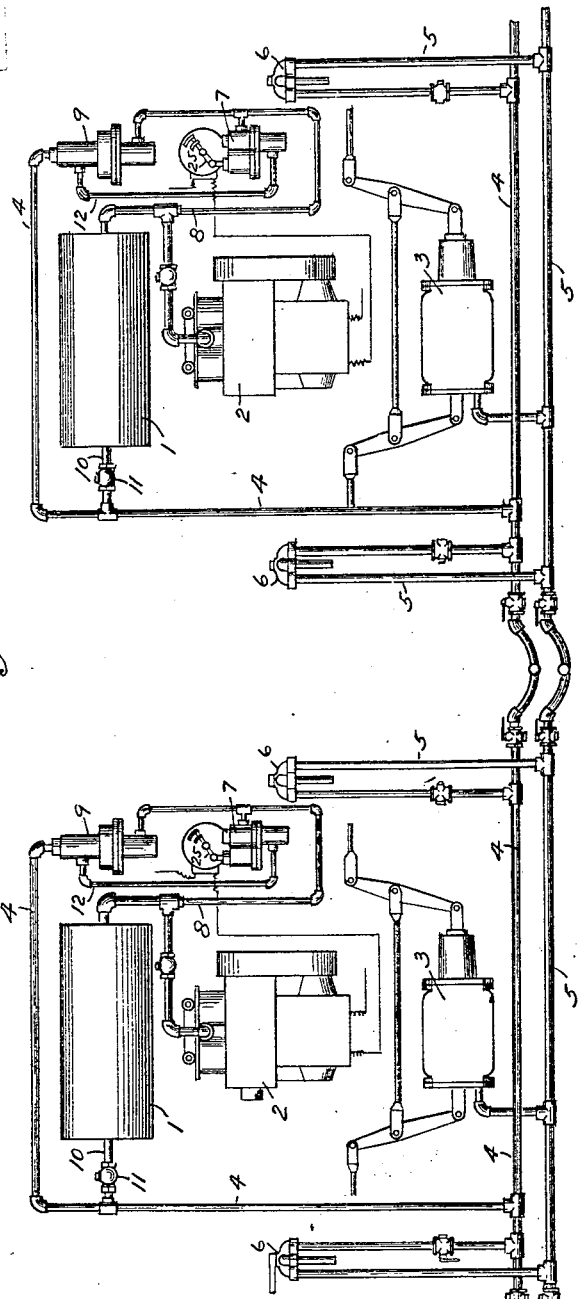

No. 866,448.  
PATENTED SEPT. 17, 1907.  
C. C. FARMER & W. V. TURNER.  
PRESSURE GOVERNING DEVICE FOR PUMPS.  
APPLICATION FILED JAN. 14, 1904.

3 SHEETS—SHEET 2.

WITNESSES  
INVENTORS  
Clyde C. Farmer  
Walter V. Turner  
By E. Wright Att'y.

No. 866,448. PATENTED SEPT. 17, 1907.
C. C. FARMER & W. V. TURNER.
PRESSURE GOVERNING DEVICE FOR PUMPS.
APPLICATION FILED JAN. 14, 1904.

3 SHEETS—SHEET 3.

WITNESSES
INVENTORS
Clyde C Farmer
Walter V. Turner
By Wright Att'y.

UNITED STATES PATENT OFFICE.

CLYDE C. FARMER, OF CHICAGO, ILLINOIS, AND WALTER V. TURNER, OF WILKINSBURG, PENNSYLVANIA, ASSIGNORS TO THE WESTINGHOUSE AIR BRAKE COMPANY, OF PITTSBURG, PENNSYLVANIA, A CORPORATION OF PENNSYLVANIA.

PRESSURE-GOVERNING DEVICE FOR PUMPS.

No. 866,448.   Specification of Letters Patent.   Patented Sept. 17, 1907.

Application filed January 14, 1904. Serial No. 188,979.

*To all whom it may concern:*

Be it known that we, CLYDE C. FARMER and WALTER V. TURNER, citizens of the United States, residing, respectively, at Chicago, county of Cook, State of Illinois, and Wilkinsburg, county of Allegheny, State of Pennsylvania, have invented a certain new and useful Improvement in Pressure - Governing Devices for Pumps, of which improvement the following is a specification.

This invention relates to pressure governing apparatus for pumps, and more particularly for air compressors which are driven by electric motors, such as now commonly employed on electrically propelled cars for supplying compressed air to the main reservoirs of the air brake system.

As ordinarily equipped, each car is provided with an electric motor driven air compressor, a main reservoir, a pressure governor operated by the main reservoir pressure for opening and closing the supply circuit to the electric motor at certain predetermined pressures, a main reservoir pipe line leading from the main reservoir to the brake valves and couplings at opposite ends of the car, a train pipe line leading from the brake valves to the brake cylinder, or triple valve, auxiliary reservoir and brake cylinder if the automatic air brake system is used, the main reservoir pipe line and the train pipe line being provided with couplings at opposite ends of the car for connecting the same with the corresponding pipe lines of adjacent cars when two or more cars are coupled up in a train.

The pressure governor which is used for controlling the electric circuit of the motor driven compressor is regulated by adjusting the tension of a spring which opposes the fluid pressure of the main reservoir, but in practice it is found to be impossible to accurately adjust a plurality of governor springs so that all of the governors will act to cut in or out their several motors at precisely the same degree of pressure, consequently when two or more cars are coupled up together in a train and their main reservoir pipes connected, it is found that some of the motor driven pumps will be cut out before the others and that the motor of the pump having the governor which cuts out at the highest pressure will be obliged to do all the work of raising the pressure of all the main reservoirs and their connected pipe line the last few degrees of pressure after the other motors have ceased working. Another and greater defect of such a system is shown when the pressure in the main reservoir and connected pipe line diminishes to the point at which one of the governors cuts in its motor and this one pump begins working, for it is now plain to be seen that this pump will gradually raise the pressure in all the main reservoirs consequently none of the other governors, all of which are adjusted to cut in at a lower pressure, will even cut in at all, so that this one pump will be required to do all the work for the entire system.

The principal object of this invention is to overcome these defects, and to provide means operated through the pressure of the main reservoir pipe line for causing all of the pumps to start working whenever the pressure is low enough to actuate the governor which is adjusted to cut in its motor at the lowest fluid pressure, and also to secure the operation of all the pumps until the pressure is sufficient to actuate the governor, which is adjusted to cut out at the highest fluid pressure, thereby producing a substantially simultaneous action of all the governors and pumps.

Certain devices embodying this invention will now be described more in detail, reference being had to the accompanying drawings, in which:—

Figure 5:
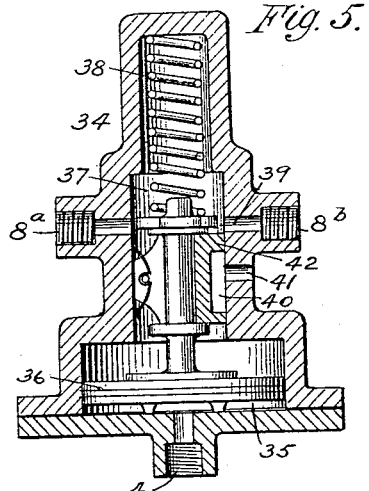
Figure 2:
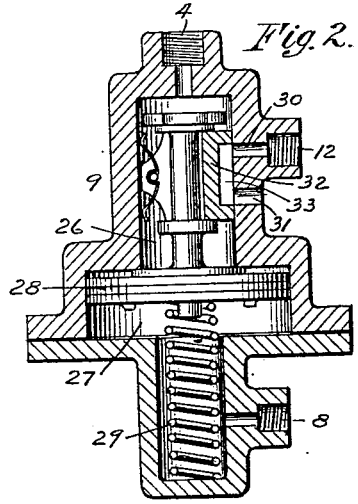
Figure 6:
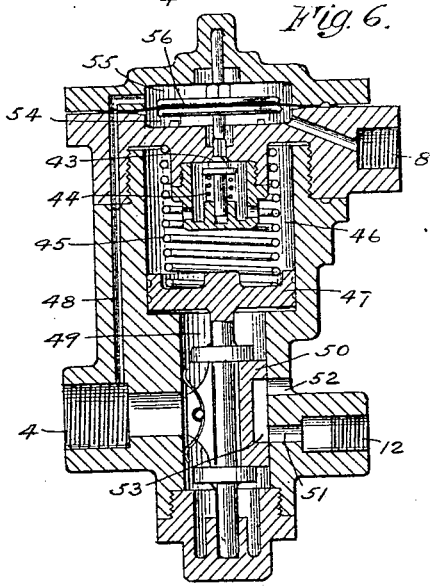
Figure 3:
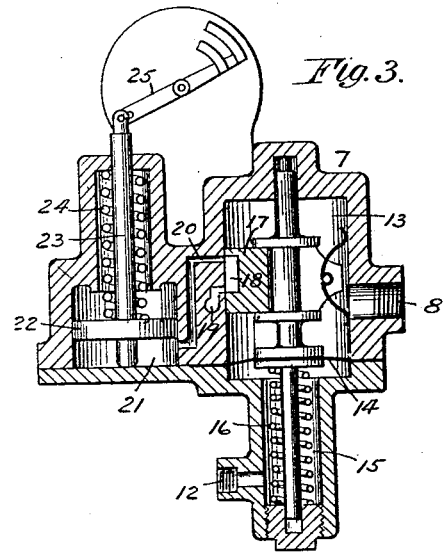
Figure 7:
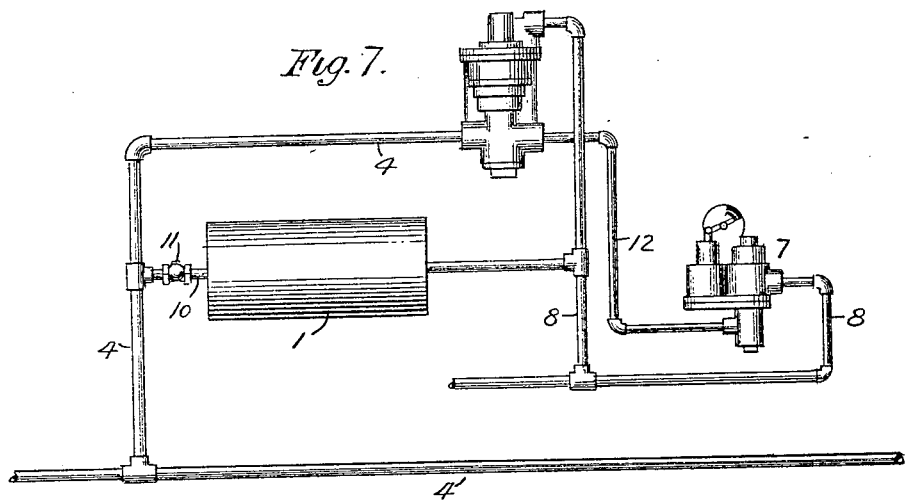

Figure 1 is a diagrammatic view showing the air brake equipment of two cars coupled together with our improvement applied thereto; Fig. 2 a sectional view showing one form of valve device adapted to be employed in this invention; Fig. 3 a sectional view of a pressure governor and switch for cutting in and out the motor for operating the pump; Fig. 4 a diagrammatic view showing a slight modification; Fig. 5 a sectional view of a valve device employed in the modification illustrated in Fig. 4; Fig. 6 a modified form of valve device which may be used in place of that shown in Fig. 2; Fig. 7 a diagrammatic view showing another slight modification; and Fig. 8 a sectional view of this last modified form of valve device.

As shown in Fig. 1, the equipment for each car comprises a motor driven air compressor 2 for supplying compressed air to a main reservoir 1, which is connected to the main reservoir pipe line 4 by a pipe 10 connecting a check valve 11 opening outward from the main reservoir to the pipe 4. Brake valves 6 are located at opposite ends of the car and connected with the main reservoir pipe 4 and train pipe 5 in the usual manner. The train pipe 5 has a branch leading to the brake cylinder 3, and both pipe lines are provided with the usual cocks and couplings at the ends of the cars. A pressure governor 7 is employed for operating the switch, or other controlling device, for stopping and starting the motor of the pump according to the pressure in the main reservoir. One form of governor which may be used for this purpose is shown in Fig. 3, and comprises a casing containing a diaphragm 14 having a stem for operating slide valve 17 in valve chamber 13, which is subject to main reservoir pressure through connecting pipe 8. The chamber 15 on the opposite side of the diaphragm contains the adjustable spring 16 which acts on the diaphragm in opposition to the main reservoir pressure. When the main reservoir pressure rises to a predetermined point sufficient to compress the spring 16 the slide valve 17 is moved to open the port 20 and admit air under pressure to the cylinder 21 beneath the piston 22, thereby forcing piston 22 and stem 23 upward against the spring 24, to throw the switch arm 25 and cut off the supply of current to the motor. When the main reservoir pressure diminishes sufficiently to allow the spring 16 to move the valve 17 to connect port 20 through cavity 18 with the exhaust port 19, the air escapes from cylinder 21 and the piston 22 is returned by means of the spring 24, which actuates the switch arm to close the circuit and start the pump. This is the normal operation of the governor when working alone upon single cars.

According to this invention, an additional valve device operated by the difference in the pressures in the main reservoir pipe line and in the main reservoir is employed for controlling the action of the governor, but this device only comes into action when two or more cars are coupled up in a train with the main reservoir pipes connected. One form of such valve device is indicated at 9, Figs. 1 and 2, and comprises a casing containing a cylindrical chamber 27 and valve chamber 26 having a movable abutment or piston 28 for operating slide valve 32, which controls the port 30 leading to pipe 12 and to the spring chamber 15 of the governor. The movable abutment 28 is subject on one side to the main reservoir pressure through pipe connection 8, and on its opposite side to the pressure of the main reservoir pipe line 4, a light spring 29 being provided to normally hold the piston and valve in position to connect port 30 through cavity 33 with exhaust port 31 whereby, when the fluid pressures are substantially equal on opposite sides of the piston 28, the spring chamber 15 of the governor will be open to the atmosphere through pipe 12, ports 30 and 31, and the apparatus will operate in the ordinary way.

When two or more cars with their train pipes and main reservoir pipes are coupled up together in a train, the brakes are usually handled by means of the brake valve at the head end of the first car, all the other brake valves being set in lap position with all ports closed. Compressed air for operating the brakes of all the cars is then supplied to this brake valve through the main reservoir pipe line from all the cars, each air compressor supplying its main reservoir and each main reservoir communicating with the main reservoir pipe line through its check valve 11. The operation will then be as follows:—Supposing all the pumps to be working to accumulate the desired pressure in the main reservoirs, as determined by the adjustment of the governor springs 16, the pressure then continues to increase in all the reservoirs until one of the governor springs is compressed sufficiently to allow its switch to be thrown to open the circuit, and cut out the motor and pump on this one car. In this way one or more of the motor driven pumps may be cut out and stopped momentarily, but the other pump or pumps on the other cars continue to operate and immediately increase the pressure in their reservoirs and in the main reservoir pipe line 4. Consequently the pressure on the upper side of the piston 28 in the valve device 9 of those pumps which have ceased working predominate over that of their respective reservoirs acting on the opposite side of said pistons, thereby causing the movement of the valve 70 to open the port 30 to the valve chamber and admit air under pressure through the pipe 12 to the spring chamber 15 of the governor. This additional pressure acting on the diaphragm 14 causes the switch to be immediately thrown back to its closed position, thus restarting all the pumps which had been cut out by the action of their governors. By this means, all of the pumps are kept working until the pressure is sufficient to actuate the last governor, that is, the one having its spring adjusted to the greatest tension and to cut out its pump at the highest pressure. It will now be readily seen that the pressure of the main reservoir pipe line will be the same as that of the main reservoir having the highest degree of pressure, and that this main reservoir will be the one that is connected with the pump whose governor spring is adjusted to the greatest tension. The other pumps will then continue to work until they have brought the pressure of their respective reservoirs, which acts upon the under side of the respective pistons 28, up to that of the main reservoir pipe line 4 acting on the opposite side of said pistons, when the spring 29 will return said piston and valve 32 to normal position, in which the spring chamber 15 of the governor is put in communication with the atmosphere through pipe 12 ports 30, 33 and 31, whereby the fluid pressure on the spring side of the governor diaphragm is released and the reservoir pressure on its opposite side, which is already in excess of the spring adjustment, operates immediately to throw the switch to open the circuit and cut out the motor. The pressure in all the main reservoirs being thus raised to the desired maximum degree and all pumps having ceased working, the pressure will then fall at substantially the same rate in all of the reservoirs, since each one is connected with the main reservoir line through its check valve and the compressed air is being drawn off from the main reservoir pipe line as it is used at the brake valve. When the pressure in any one of the reservoirs has diminished to the point at which the governor spring, which is the one adjusted at the greatest tension, actuates its switch or controlling device to supply current to its motor driven pump, this pump operates alone for a few moments during which time it raises the pressure in its main reservoir and the reservoir pipe line sufficiently above that remaining in the other main reservoirs to cause the pistons 28 and valves 32 to move down and admit reservoir pressure to the spring chambers 15 of all the governors on the other cars and thus immediately actuate the switches to start all of the pumps into action. The operation is then repeated as before described, and in this way each one of the pumps is required to do its share of the work, and all of the governors are controlled and made to operate with the one whose spring is adjusted to the greatest tension.

According to the modified form of valve device shown in Fig. 6, a diaphragm 56 is subjected to the opposing pressures of the main reservoir pipe line 4 in chamber 55 and the main reservoir pressure in chamber 54, for operating the auxiliary valve 43 for controlling the pressure in the chamber 46 back of the main piston 47, which actuates the slide valve 50 controlling ports 51 and 52. The fluid under pressure from the main reservoir pipe line 4 is admitted to the valve chamber 49 and leaking around the loosely fitting piston 47 accumulates an equal pressure in chamber 46, the small valve 43 being closed, and the light spring 45 then holds the piston and valve in normal position with pipe 12 leading from the spring chamber 15 of the governor open to the atmosphere through ports 51, 53 and 52. The main reservoir pipe pressure also communicates with the chamber 55 above the diaphragm through port or passage 48, so that if the pump on any other car is cut in and raises the pressure in the main reservoir pipe line above that of the reservoir of this particular car the diaphragm 56 will be depressed sufficiently to open the small auxiliary valve 43 against the pressure of its spring 44, thereby releasing a portion of the air in chamber 46 to the pipe 8 and the lower main reservoir, so that the higher pressure acting on the opposite face of piston 47 moves the same with valve 50 to open port 51 and supply reservoir pressure through pipe 12 to the spring chamber of the governor as before described for securing the action of all the governors. When the pressure in the main reservoir increases sufficiently to raise the diaphragm 56 against the pressure of the reservoir line, the valve 43 will be closed by means of its spring 44, and as the pressure immediately equalizes around the piston 47 the spring 45 will move said piston and valve 50 to normal position, in which the pressure from the spring chamber 15 of the governor is released to the atmosphere and the governor is actuated to cut out its motor pump. This form of valve device is designed to be more sensitive than that shown in Fig. 2, and eliminates any danger of leakage past the piston 28.

Figs. 4 and 5 illustrate another modification, in which the valve device 34 is interposed between the main reservoir and the ordinary pressure chamber or valve chamber 13 of the governor, this form of valve device comprising a casing containing a piston chamber 35, piston 36 connected to slide valve 42 in chamber 37, which communicates with the main reservoir through pipe 8ᵃ and with the pressure chamber of the governor through port 39 and pipe 8ᵇ when the valve is in its normal position, as shown. When the fluid pressures on opposite sides of piston 36 are substantially equal the light spring 38 holds the valve and piston in and the pressure chamber 13 of the governor is in open communication with its main reservoir through the pipes 8ᵃ and 8ᵇ, so that the governor operates in its usual manner, as when one car is running alone. When two or more cars equipped with this device are coupled up into a train and one of the pumps is cut into action by its governor, the pressure accumulating in that particular main reservoir and consequently through its check valve connection into the main reservoir pipe line 4, raises the pressure on the lower side of piston 36 of the valve devices on all the cars that have pumps that have not started working, thereby causing said pistons to move their respective valves sufficiently to connect ports 39 and 41 through cavity 40. This immediately releases the air under pressure in the valve chamber 13 above the diaphragm of the governor to the atmosphere, and the spring 15 then being unopposed causes the operation of the switch to its closed position for starting its pump into action. All of the pumps on the respective cars are thus started working at substantially the same time that any one of them is cut in by its governor, regardless of the difference in the adjustment of their respective governor springs; and in the same way all continue to operate until the pressure is sufficient to cut out the governor set at the highest pressure, as before explained. After the pump having the governor which is adjusted at the highest pressure is cut out, the remaining pumps continue to operate for a few strokes, sufficient to bring the pressure of their respective reservoirs up to that of the main reservoir line 4, which, until then, has been maintained slightly in excess by the leading pump, the pistons 36 and valves 42 are then returned to normal position, as indicated in Fig. 5, and main reservoir pressure is again supplied to the diaphragm of each pump, thus causing the action of all the governors to cut out the pumps.

Figure 8:
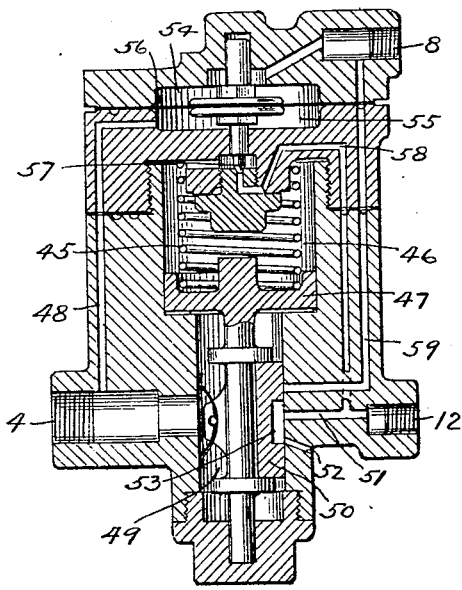

The modification illustrated in Figs. 7 and 8 is substantially the same as that shown in Fig. 6, with the exception that the small valve 57 controlled by the diaphragm 56, operates to release air from the chamber 46 through an additional port or passage 58 to the port 51 connected with pipe 12 leading to the spring chamber of the governor, and consequently this port 58 is normally open to the atmosphere through cavity 53 in slide valve 50 and exhaust port 52. This slide valve is made longer than the one shown in Fig. 6, so that the ports are always covered by the valve and do not open into the valve chamber 49, but an additional port or passage 59 leads from pipe connection 8 of the main reservoir to the valve seat and is adapted to be put in communication with port 51 through the cavity 53 when the slide valve moves to its upper position. The operation of this form of my improvement is as follows: Supposing that one of the pumps has started by being cut in by its governor, the pressure accumulates in the main reservoir line, as before explained, and consequently rises in the chamber 55 on one side of diaphragm 56 to a degree higher than that of this particular main reservoir which obtains in the chamber 56 on the opposite side. This causes the diaphragm to move and open the small valve 57, thereby establishing communication between the chamber 46 back of the piston 47, and the atmosphere through ports 58, 53 and 52. The pressure in chamber 46 therefore falls suddenly and the predominating pressure of the main reservoir pipe line in the valve chamber on the opposite side of said piston immediately moves the same to its upper position, in which ports 59 and 51 are connected by the cavity 53, thereby supplying air from the main reservoir to the spring chamber of the governor and causing its pump to be immediately cut in. It will also be noticed that this upward movement of the piston 47 and valve 50 closes the exhaust port 52, thereby preventing further leakage of compressed air through port 58 to the atmosphere. The pumps will thus all be started working and the pressures will then continue to accumulate at substantially the same rate upon the opposite sides of the diaphragm 56, but in the meantime, as the exhaust port 52 is closed, the pressure readily equalizes around the piston 47 and the spring 45 returns the piston and slide valve to normal position, in which the air from the spring chamber of the governor is released to the atmosphere. Should one of the governors then cut out before another having a higher spring pressure, it will be immediately cut in again by means of this improved device, as before explained, and all of the pumps will be kept working until the one having the governor set at the highest spring pressure is cut out, when they all cease working.

It will now be apparent that by means of this invention all the pumps of a series of motor cars coupled in a train, and having their main reservoirs connected, may be automatically started and stopped substantially simultaneously; that each pump will be required to do an equal share of the work of compressing the air in the main reservoirs, and that this is accomplished without the addition of an extra air line or electric line involving additional couplings extending through the train. It will also be evident that we have provided a simple, compact and durable device for this purpose, and one which is positive and reliable in action.

While we have described our improvement as used with a particular type of pressure governor device, in which a diaphragm or other movable abutment subject to the opposing pressures of the main reservoir and an adjustable spring, is employed for operating a switch or other motor controlling device, it will be understood that our invention is not limited to this type of governor device, but may also be applied to all forms of governors which are operated by the reservoir pressure to control the action of the pump, and it covers broadly any form of means operated by the pressure of the main reservoir pipe line for supplementing the action of the pressure governing devices in opening and closing the switches or other controlling devices for the pumps.

Having now described my invention, what I claim as new and desire to secure by Letters Patent is:—

1. In an apparatus of the character described, the combination with an air pump, a main reservoir, and a main reservoir pipe line connected to said reservoir with means for preventing back flow to the reservoir, of a movable abutment operated by main reservoir pressure for controlling said pump, and means operated through the pressure of the main reservoir pipe line for controlling the action of said movable abutment.

2. In an apparatus of the character described, the combination with an air pump, a main reservoir, and a main reservoir pipe line connected to said reservoir with means for preventing back flow to the reservoir, of a movable abutment subject to the opposing pressures of the main reservoir and an adjustable spring for controlling said pump, and means actuated by the pressure of the main reservoir pipe line for varying the pressures upon said abutment.

3. In an apparatus of the character described, the combination with an air pump, a main reservoir, and a main reservoir pipe line connected to said reservoir with means for preventing back flow to the reservoir, of a movable abutment subject to the opposing pressures of the main reservoir and an adjustable spring for controlling said pump, and means operated by the opposing pressures of the main reservoir and the main reservoir pipe line for controlling the action of said movable abutment.

4. In an apparatus of the character described, the combination with an air pump, a main reservoir, and a main reservoir pipe line connected to said reservoir with means for preventing back flow to the reservoir, of valve mechanism operated by the opposing pressures of the main reservoir and the main reservoir pipe line for controlling said pump.

5. In an apparatus of the character described, the combination with an air compressor, a main reservoir pipe line, a main reservoir communicating with said main reservoir pipe line through a non-return valve, of a movable abutment subject to the opposing pressures of the main reservoir and an adjustable spring for controlling said compressor, and a valve device actuated by the pressure of the main reservoir pipe line for varying the pressure upon one side of said abutment.

6. In an apparatus of the character described, the combination with an air compressor, a main reservoir pipe line, a main reservoir communicating with said main reservoir pipe line through a non-return valve, of a movable abutment subject to the opposing pressures of the main reservoir and an adjustable spring for controlling said compressor, and a valve device operated by the opposing pressures of the main reservoir and the main reservoir pipe line for controlling the action of said movable abutment.

7. In a pressure governing apparatus, the combination with a motor driven air compressor, a main reservoir supplied thereby, a main reservoir pipe line supplied from said main reservoir, and a check valve for preventing back flow to the main reservoir, of a controlling device for the motor, a piston for operating said device, a valve and diaphragm operated by main reservoir pressure for governing the supply of air to said piston, and a valve device actuated by the pressure of the main reservoir pipe line for varying the pressure upon one side of said diaphragm.

8. In an apparatus of the character described, the combination with an air compressor, a main reservoir pipe line, a main reservoir communicating with said main reservoir pipe line through a non-return valve, of a movable abutment subject to the opposing pressure of the main reservoir and an adjustable spring for controlling said compressor, a valve for controlling the supply of air under pressure to one side of said abutment, a piston for operating said valve, a diaphragm subject to the opposing pressures of the main reservoir and the main reservoir pipe line, and an auxiliary valve operated by said diaphragm for varying the pressure upon one side of said piston.

9. In an apparatus of the character described, the combination with an air compressor, a main reservoir pipe line, a main reservoir communicating with said main reservoir pipe line through a non-return valve, of a movable abutment subject to the opposing pressures of the main reservoir and an adjustable spring for controlling said compressor, a valve for controlling the supply of air under pressure to one side of said abutment, a piston subject to opposing fluid pressures for operating said valve, a diaphragm subject to opposing pressures of the main reservoir and the main reservoir pipe line, and an auxiliary valve actuated by said diaphragm for releasing fluid under pressure from one side of said piston.

10. In an apparatus of the character described, the combination with an air compressor, a main reservoir pipe line, a main reservoir communicating with said main reservoir pipe line through a non-return valve, of a movable abutment subject to the opposing pressures of the main reservoir and an adjustable spring for controlling said compressor, a valve for controlling the supply of air under pressure to one side of said abutment, a piston subject to opposing fluid pressures for operating said valve, a diaphragm subject to opposing pressures of the main reservoir and the main reservoir pipe line, and an auxiliary valve actuated by said diaphragm for releasing fluid under pressure from one side of said piston to the atmosphere.

11. In an apparatus of the character described, the combination with an air compressor, a main reservoir pipe line, a main reservoir supplied from said compressor and communicating with said main reservoir pipe line through a non-return valve, of a movable abutment subject to the opposing pressures of the main reservoir and an adjustable spring for controlling said compressor, a valve for controlling the supply of air under pressure to one side of said abutment, a piston subject to opposing fluid pressures for operating said valve, a diaphragm subject to opposing pressures of the main reservoir and the main reservoir pipe line, and an auxiliary valve actuated by said diaphragm for opening a release passage from one side of said piston to the atmosphere, and means operated by the movement of said piston for closing said release passage.

12. In combination, a plurality of fluid-compressors, a common receptacle supplied thereby, check-valves between the several compressors and said receptacle, and governors controlling the several compressors, each of said governors comprising two movable abutments, one of said abutments being arranged to respond to a difference between the pressures of its compressor and of said receptacle, and the other abutment being arranged to respond to a variation in one of said pressures.

13. In combination, a plurality of fluid-compressors, a common receptacle supplied thereby, check-valves between the several compressors and said receptacle, and governors controlling the several compressors, each of said governors comprising two movable abutments, one of said abutments being subjected on opposite sides to the pressures of its compressor and of said receptacle, and the other being subjected to only one of said pressures.

14. A pressure governing apparatus comprising a main switch or controlling device and a piston for actuating the same, a movable abutment and valve for controlling the pressure on said piston, and means subject to the opposing pressures from different pumps for controlling the action of said movable abutment.

15. A pressure governing apparatus comprising a main switch or controlling device and an actuating piston therefor, a fluid pressure operated valve device for controlling the pressure on said piston, and means subject to the opposing pressures from different pumps for controlling the operation of said valve device.

16. A pressure governing apparatus comprising a main switch or controlling device and an actuating piston therefor, a valve device operated by the reservoir pressure for controlling the pressure on said piston, and means subject to the opposing pressures from different pumps for controlling the operation of said valve device.

In testimony whereof we have hereunto set our hands.

CLYDE C. FARMER.
WALTER V. TURNER.

Witnesses:
R. F. EMERY,
JAS. B. MACDONALD.